Nov. 2, 1948. E. W. ALLEN 2,452,710
TONGUE STABILIZER FOR VEHICLES
Filed March 4, 1946 2 Sheets-Sheet 1

ELMO W. ALLEN Inventor

By Francis C. Huebner,
Attorney

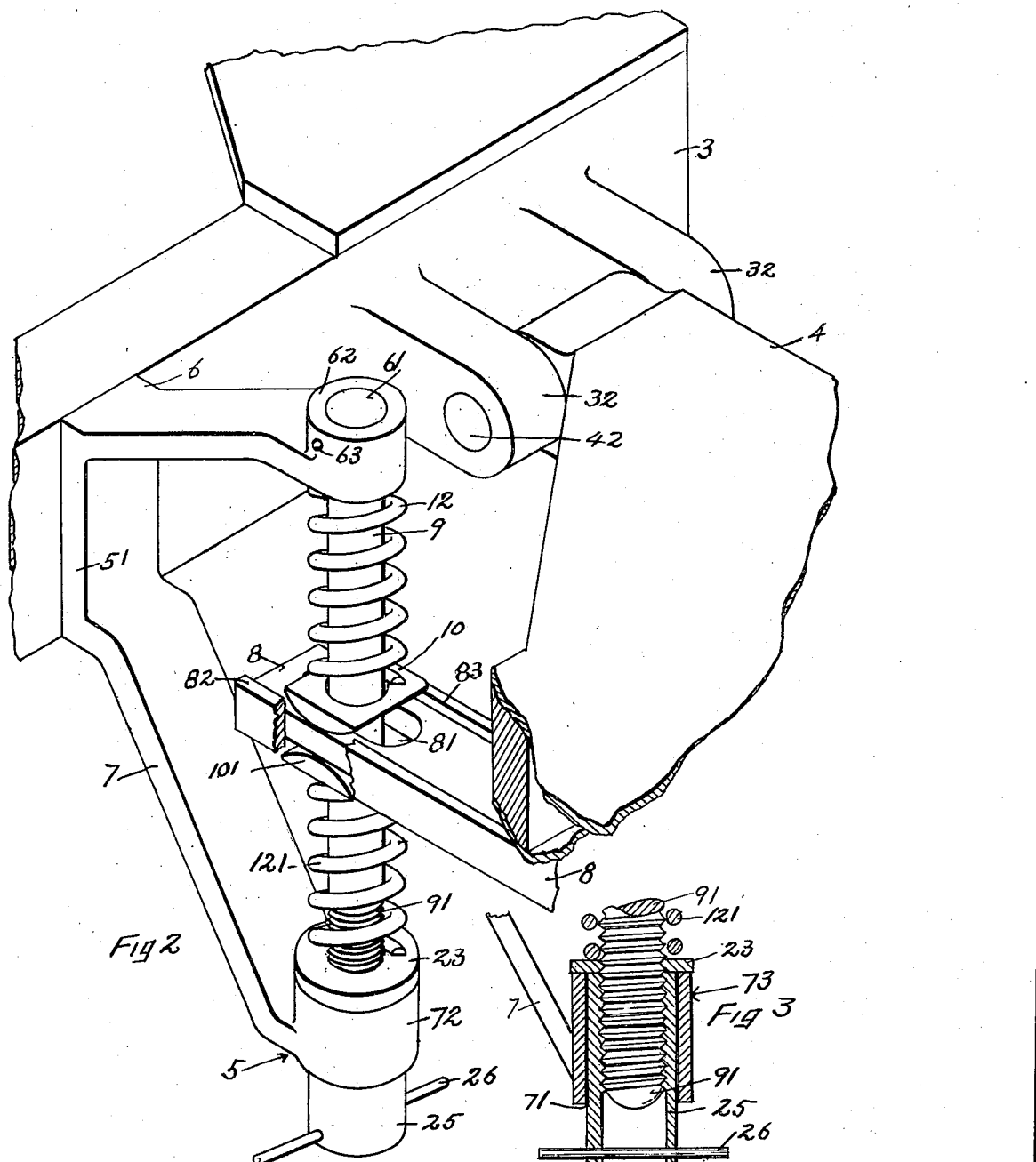

Patented Nov. 2, 1948

2,452,710

UNITED STATES PATENT OFFICE 2,452,710

TONGUE STABILIZER FOR VEHICLES

Elmo W. Allen, Fresno, Calif., assignor to Stan-Wall Manufacturing Company, Fresno, Calif., a corporation of California Application March 4, 1946, Serial No. 651,834

7 Claims. (Cl. 280—33.44)

My invention relates to an improved tongue stabilizer. More specifically it is adapted for use on a converter gear.

In the trucking or hauling business the use of semitrailers with a truck tractor for the power means is quite common. A truck tractor is provided with a fifth wheel. The semitrailer is constructed without a front axle or front wheels. When the semitrailer is hitched to, or assembled with the truck tractor, the front end of the semitrailer rests on the fifth wheel of the truck tractor, and the combination thus formed forms a unit of transportation. In long hauls it is desirable to have double units, that is one truck tractor will draw two or more trailers, and it has been found profitable to convert a semitrailer into a trailer having a front and rear axle for that purpose. The reason is that the truck tractor can take two or more semitrailers separately to different local points for loading, and when they are loaded they can be moved by the truck tractor to a common point from which the long haul starts, and at such point it is necessary to convert the semitrailers into what is known as four-wheel trailers so that two or more can be assembled as a double, or treble unit. The device used to change a semitrailer into a four wheel trailer is termed a converter gear which is briefly described as a one axle carriage carrying a fifth wheel which is an approximate duplicate of the fifth wheel of the truck tractor, and which attaches to, and cooperates with the front end of the semitrailer in the same manner as the fifth wheel on the truck tractor cooperates with the front end of the semitrailer. When the converter gear is thus assembled with the semitrailer and a four wheel trailer is thereby formed, it can be coupled with any vehicle desired by means of an ordinary trailer hitch. My invention relates to a stabilizer which will hold the tongue of the converter gear in an approximately horizontal, but yielding position.

The main object accomplished by my invention is as follows: The converter gear above described is assembled with the semitrailer by rolling, or moving it under the front end of the semitrailer to which it is to be connected. As the converter gear is usually heavy it is the practice to do this rolling, or moving with a truck tractor, or other power. The tongue connecting the converter gear with the power for moving it is hinged to the frame of the converter gear, the hinge being adapted for the tongue to have a radial vertical movement, as such movement is necessary when the vehicle thus formed is traveling over ordinary roads. When assembling the converter gear with the semitrailer by backing the converter gear under it, and, when disassembling those elements, the push, or the pull on the converter gear is apt to cause it to buckle up, or buckle down with the hinge connecting the tongue to the converter gear as the pivot of said buckling movement, thus interfering with the object of assembling the converter gear with the semitrailer. Heretofore it has been necessary to employ a man to hold said converter gear and its tongue from thus buckling in order to hold the converter gear and semitrailer in position to couple them together. My invention yieldingly holds the tongue and frame of the converter gear in a yielding approximately horizontal position automatically while such assembling of the converter gear and semitrailer is being made.

Other objects will be suggested in the description which follows.

To accomplish these objects I have invented the device hereinafter described and illustrated on the accompanying drawing in which Fig. 1 shows a fractional view of a converter gear with a tongue attached having my stabilizer thereon.

Fig. 2 is an enlarged view of the stabilizer as attached to a converter gear.

Fig. 3 is a sectional view of spring tension adjusting means.

Figure 1:
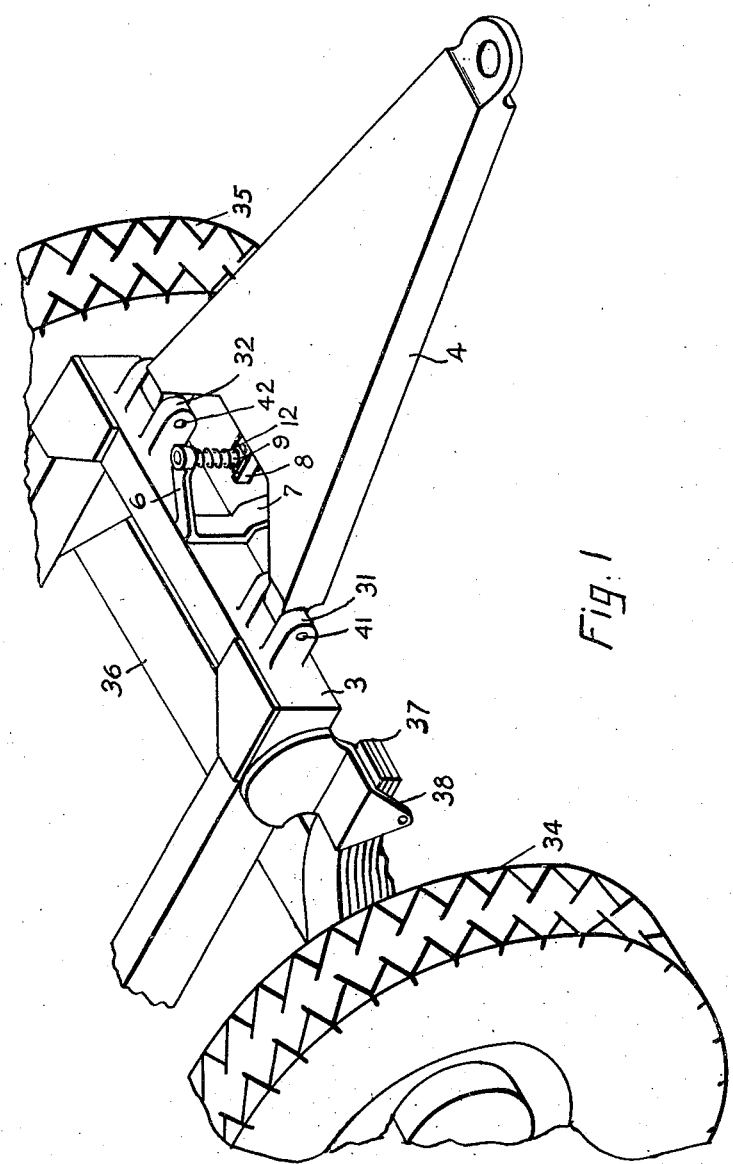

In Fig. 1 of the drawing are shown dogs 31 and 32 which are attached to the front beam 3 of the converter gear, said dogs being a part of the hinge which pivotally connects a tongue 4 to the converter frame, pivot bolts 41 and 42 being other essentials for said hinge. Other elements of the converter gear shown in Fig. 1 are wheels 34 and 35, axle 36, and body springs 37 attached to axle 36, and bearing against bracket 38, which bracket 38 is attached to beam 3.

Tongue stabilizer 5 has a bracket 51 attached rigidly to beam 3. Bracket 51 consists of an upper extended arm 6 and a lower extended arm 7, which arms are positioned on a common vetrical plane. The free ends of arms 6 and 7 terminate with means 62 and 72 which are adapted to hold a pin 9. To do this means 62 at the end of arm 6 has a hole 61 therethrough adapted to neatly receive an end of pin 9, and means 72 at the end of arm 7 has a hole 71 which is adapted to receive a spring tension adjusting means 73, shown in Fig. 3, which spring adjusting means receives an end of pin 9 as more fully set forth herein. Holes 61 and 71 should have a common center line. Pin 9 is anchored to arm 6 by means of a light pin 63 passing through pin 9 and end means 62 which engages pin 9.

Tongue 4 has a bar 8 rigidly attached thereto, said bar having an elongated hole 81 through the free end thereof, through which hole 81 pin 9 can pass when the converter gear is assembled. Bar 8 being rigidly connected with tongue 4, any movement of the bar is communicated to tongue 4, and movements of the tongue are directly communicated to the bar. When tongue 4 is in an approximately horizontal position, the end of bar 8 which encircles pin 9 is approximately located near the middle of pin 9.

Rocker washers 10 and 101 have one plain face and an opposite convex face. When assembled with the converter gear, washer 10 is positioned immediately above bar 8 and encircles pin 9, and washer 101 encircles pin 9 and is positioned directly under beam 8. These washers are positioned with convex faces adjacent to bar 8, the object being that any radial movement of tongue 4 and bar 8, the washers can continue to bear against the upper and lower faces of bar 8, and the plain faces can remain approximately on horizontal planes and function as spring seats as hereinafter explained. Flanges 82 and 83 are formed to hold washers 10 and 101 in a fixed relation to bar 8. Washers 10 and 101 can rock between flanges 82 and 83 when tongue 4 is raised or lowered.

A compression spring 12 encircles pin 9, one end thereof resting against the lower face of member 62, and the other end being seated on the plane face of washer 10. A second compression spring 121 encircles pin 9, one end of spring 121 resting on plate 23, and the other end against the plane face of washer 101. To adjust the tension of both of these springs, the lower end of pin 9 has been threaded, the threaded portion being identified as 91 in Figs. 2 and 3. A sleeve 25 is internally threaded to screw on the threaded portion of pin 9, and the outside surface of sleeve 25 fits within bore, or hole 71 which is within member 72, being the free end of arm 7. A handle 26 is adapted to rotate sleeve 25 on threaded portion 91 of pin 9. On the top of sleeve 25 is a plate 23, being the base for spring 121, and it will be observed that screwing sleeve 25 upward, or downward on pin 9 will increase, or diminish the tension of the springs 12 and 121 herein described. The greater the tension of the springs 12 and 121, the greater the normal tendency of holding tongue 4 in a horizontal position.

I claim:

1. In combination with a one axle carriage having a frame, a tongue pivotally connected with the frame, and means adapted to normally and yieldingly hold said tongue in an extended horizontal position, consisting of a bracket rigidly attached to the frame of the carriage, a bar rigidly attached to the tongue of the carriage the bracket having arms extending in a direction to overlap the free end of the bar, and being aligned therewith a pin extending through the arms and the bar, the bar being adapted to move freely on the pin between the two arms, compression springs positioned around the pin on either side of the bar and adapted to bear against the bar and against the arms on the bracket, and means for adjusting the tension of said springs.

2. In a device of the character described in claim 1, rocker spring supports for said springs adapted as seats for said springs, and adapted to rock on the bar when the tongue is moved on its hinges.

3. In combination with a vehicle having a frame and a tongue pivotally connected with the frame, the pivotal connection adapting the tongue to have a vertically, radial movement, and a tongue stabilizer consisting of a bar rigidly attached to the tongue and extending backward therefrom to near the pivotal line of the tongue, said bar having a hole therethrough near its free end, a bracket rigidly attached to the frame of the vehicle having two extending arms with a pin connecting the arms at their free ends, said pin passing through the hole in the bar, compression springs encircling the pin, one compression spring being positioned above the bar and under the upper arm, and the other compression spring being positioned under the bar and above the lower arm, said springs being adapted to yieldingly hold the tongue in an approximately horizontal position.

4. A tongue stabilizer for a vehicle having a frame, a tongue hingedly connected to the frame, the tongue being adapted to have a vertical radial movement, and a bracket rigidly attached to the frame, the bracket having an upper and a lower arm, said arms being arranged parallel with each other, one of the arms overlapping and the other arm underlapping a portion of the tongue, holes passing through the arms and through the tongue, the holes being aligned, a pin adapted to pass through said holes, and to be held in assembled relation by an arm of the bracket, two compression springs adapted to encircle the pin, one of the springs being above the tongue and the other below the tongue, and means for equalizing the pressure imparted to the springs.

5. A device of the character described in claim 4 in which the hole through the tongue adapted for the pin to pass through is elongated and adapted for the tongue to have a vertical movement when the pin is assembled with the bracket and tongue.

6. A tongue stabilizer for a vehicle having a frame, a tongue hingedly attached to the frame adapting the tongue to have a vertical movement, and at right angles to the plane of the frame, an upper and a lower arm attached to the frame, and extending outwardly in parallel relation from the frame, one of said arms overlapping and the other arm underlapping a portion of the tongue, aligned holes through the arms and the tongue, a pin extending through said holes and adapted to be held therein when thus assembled, compression springs encircling the pin, one above the tongue and one under the tongue, said springs being approximately balanced as to spring pressure, and adapted to yieldingly hold the tongue in an approximately horizontal position.

7. In a device described in claim 6, screw means adapted to regulate the relative tension of the springs.

ELMO W. ALLEN.

REFERENCES CITED

The following references are of record in the file of this patent:

UNITED STATES PATENTS

| Number | Name | Date |
| --- | --- | --- |
| 1,840,435 | Davis | Jan. 12, 1932 |
| 2,254,532 | Knox | Sept. 2, 1941 |